Figure 1:
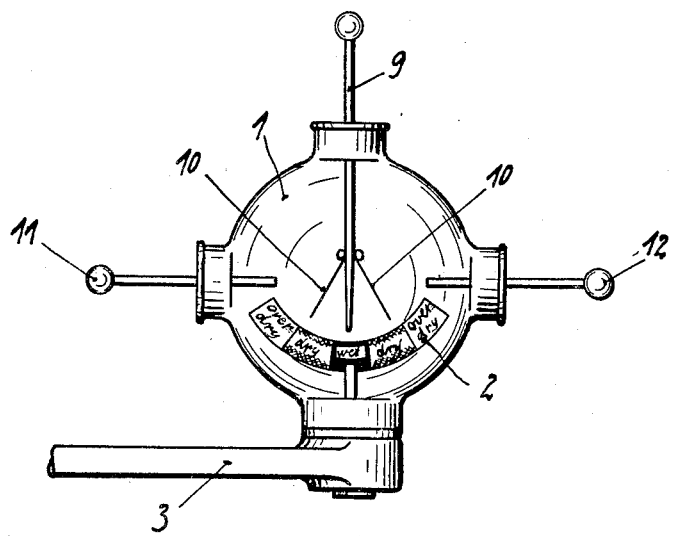

Aug. 15, 1933.   R. DIRKS   1,922,933

MEASURING METHOD

Filed June 1, 1932

Patented Aug. 15, 1933

1,922,933

UNITED STATES PATENT OFFICE 1,922,933

MEASURING METHOD

Richard Dirks, Chemnitz, Germany

Application June 1, 1932, Serial No. 614,778, and in Germany July 30, 1930

3 Claims. (Cl. 175—183)

This invention relates to a measuring method for widths of fabric, for instance, paper, webs or similar sheets continually coming out of drying devices, calenders, raising and warping machines which have a frictional effect upon the widths of material concerned whereby an electrostatic charge is produced, and the invention consists in making this electrostatic charge the basis of the measuring operation. The intensity of the charge permits quite reliable conclusions as to the quality of the material and makes it possible to operate the working machines concerned always at highest efficiency. Hitherto, the electrostatic charge of a width of material has not been made much use of as a basis of measurement for working and testing processes, and a series of successful experiments has shown that the intensity of the electrostatic charge of the width of material concerned can safely be taken as basis for the following measuring processes.

Firstly, for the determination of the moisture contents of sheets of material continually emerging from drying devices. During drying the intensity of the electrostatic charge depends solely on the moisture contents of the material. It is practically zero when the condition of the material is wet-moist, attains a mean value when the dryness of the material is equal to the latter's natural moisture content, and exceeds this mean value when the natural moisture content is dried out further.

Secondly, the determination of pressure on widths of fabric or the like continually coming out of calenders. During calendering, the intensity of the electrostatic charge depends solely on the pressure exerted on the material and the effect attained for a given width of material is recorded together with its electrostatic charge, so that during the subsequent treatment of similar widths of material calendering pressure may be varied until the same electrostatic charge is attained which insures an effect equal to that produced with respect to the previously treated widths of material.

Thirdly, the determination of the operating time of a machine by means of the width of material coming continually out of raising, warping or other machines. The frictions involved produce an electrostatic charge, and an electrometer provided with a recording mechanism will then clearly distinguish between the actual working run of a machine and its stops or the periods when it runs without material.

The measuring methods which are possible according to the invention and which are indicated above are closely related to, and dependent on, the width of material, which renders them superior to other methods taking as basis of measuring either the humidity of the air, the electric conductivity of the fabric or stuff, or the running of the machine gear for the reason that each member interposed between the width of material and the measuring instrument possesses its own sources of error. The invention employs the usual electrostatic measuring instruments which are arranged near or on the width of fabric.

Figure 2:
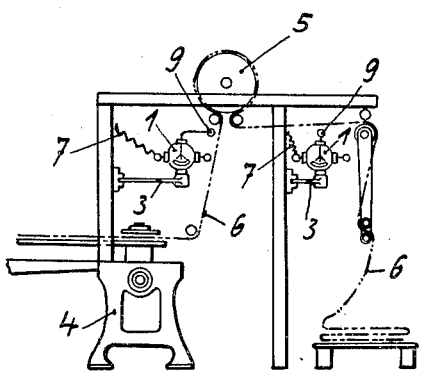
Figure 3:
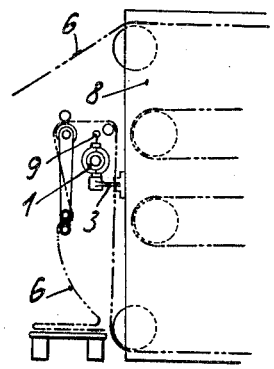

The invention is illustrated in the accompanying drawing, in which Figure 1 is a view of a device for carrying out the invention in order to determine the moisture contents of widths of material; Figs. 2 and 3 show the connection of an electrometer with drying machines.

Referring to the drawing, 1 is an electroscope of the usual type provided with the receiving electrode 9 disposed opposite to the direction of the width of fabric and carrying at its end the metal blades 10 which serve as pointers. 11 and 12 are lateral electrodes for earthing the case. The pointers 10 move over a scale 2 which, according to the empirical values ascertained, distinguishes between "wet", "dry", and "overdry". The arm 3 serves for connecting the electrometer. By means of known type which act a distance the position of the pointers can be indicated anywhere, recorded or used for the automatic adjustment of the machine concerned. Other electrometers, particularly those employed in radio work, may be used also.

Figs. 2 and 3 show how the electrometer 1 is attached to drying machines. In Fig. 2, the width of fabric 6 continually emerges from a drying machine 4, passes over a drying drum 5 and is then laid off. An electrometer 1 is disposed between the drying machine 4 and the drum 5 and another electrometer 1 is arranged behind the drum 5. The wire 7 grounds the electrometer casing. In Fig. 3 the measuring instrument 1 is positioned a distance to the rear of the fabric outlet of the drying machine 8. The best way to attach it depends on the type of machine used, and attachment may take place also behind the after-treatment devices or near the place where the fabric is laid off. The current-taker for the electrometer near the width of fabric or on the latter may be connected with the electrometer by a line of suitable length.

I claim:—

1. A method of measuring widths of material, which continually emerge from their working machines and which receive an electrostatic charge by the friction due to their motion, consisting in measuring the electrostatic charge on the widths of material as the basis of measurement.

2. A device for carrying out the method described and determining the moisture contents of widths of material continually emerging from drying devices, comprising measuring instruments adapted to respond to electrostatic charges, the said instruments being disposed near or on the widths of material.

3. A device for carrying out the method described and determining the moisture contents of widths of material continually emerging from drying devices, comprising electrometers adapted to respond to electrostatic charges, the said electrometers being disposed near or on the widths of material.

4. A device for carrying out the method described and determining calender pressure on widths of material continually emerging from a calender, comprising measuring instruments adapted to respond to electrostatic charges, the said instruments being disposed near or on the widths of material.

5. A device for carrying out the method described and determining calender pressure on widths of material continually emerging from a calender, comprising electrometers adapted to respond to electrostatic charges, the said electrometers being disposed near or on the widths of material.

6. A device for carrying out the method described and determining the useful work of machines for treating widths of material, comprising electrometers adapted to respond to electrostatic charges, the said electrometers being disposed near or on the widths of material.

7. A method of measuring widths of material, which consists in charging the material to be tested as the basis of measurement, and utilizing electrostatic charges on the material to be tested.

8. A method of measuring widths of material, which consists in charging the material, and utilizing measuring instruments for measuring the electrostatic charge on the material.

RICHARD DIRKS.